United States Patent [19]

Young et al.

[11] Patent Number: 4,795,536

[45] Date of Patent: Jan. 3, 1989

[54] HYDROGEN SEPARATION AND ELECTRICITY GENERATION USING NOVEL THREE-COMPONENT MEMBRANE

[75] Inventors: Ping Young, Hoffman Estates; Anthony J. Polak, Lake Zurich, both of Ill.

[73] Assignee: Allied-Signal Inc., Morris Township, Morris County, N.J.

[21] Appl. No.: 70,622

[22] Filed: Jul. 6, 1987

Related U.S. Application Data

[63] Continuation of Ser. No. 753,495, Jul. 10, 1985, abandoned.

[51] Int. Cl.⁴ ............................ C25B 1/02; C25B 9/00
[52] U.S. Cl. ................................. 204/129; 204/252; 204/277; 204/278; 429/33; 429/192
[58] Field of Search ............... 204/129, 130, 252, 277, 204/278, 421, 425, 426, 427; 429/30, 33, 192

[56] References Cited

U.S. PATENT DOCUMENTS

| | | | |
|---|---|---|---|
| 2,824,620 | 2/1958 | de Rosset | 183/2 |
| 2,958,391 | 11/1960 | de Rosset | 183/2 |
| 3,265,536 | 8/1966 | Miller et al. | 136/86 |
| 3,276,910 | 10/1966 | Grasselli et al. | 136/86 |
| 3,392,096 | 7/1968 | Lawton et al. | 304/252 X |
| 3,401,099 | 9/1968 | McEvoy | 204/129 |
| 3,489,670 | 1/1970 | Maget | 204/129 |
| 3,499,265 | 3/1970 | Langley et al. | 55/158 |
| 3,528,858 | 9/1970 | Hodgdon, Jr. et al. | 429/33 |
| 3,724,672 | 4/1973 | Leonard et al. | 210/500 |
| 4,024,036 | 5/1977 | Nakamura et al. | 204/129 |
| 4,179,491 | 12/1979 | Howe et al. | 423/253 |
| 4,295,952 | 10/1981 | de Nora et al. | 204/252 |
| 4,306,774 | 12/1981 | Nicholson | 350/356 |
| 4,313,013 | 1/1982 | Harris | 585/818 |
| 4,500,667 | 2/1985 | Polak et al. | 524/406 |
| 4,560,444 | 12/1985 | Polak et al. | 204/1 T |

OTHER PUBLICATIONS

The Condensed Chem. Dictionary, 9th Ed., G. Howley, Van Nostrand Reinhold Co., 1977, pp. 11, 679–680.
Lundsgaard, J. S. et al., "A Novel Hydrogen Gas Sensor Based on Hydrogen Uranyl Phosphate," *Solid State Ionics* 7 (1982) 53–56, North-Holland Publishing Company.
Grashoff, G. J., et al., "The Purification of Hydrogen," *Platinum Metals Review*, vol. 27, Oct. 1983, No. 4, p. 157.
Berry, Reginald I., "Membranes Separate Gas," *Chemical Engineering*, Jul. 13, 1981, p. 63.
Yamashiro, H., et al., "Plant Uses Membrane Separation," *Hydrocarbon Processing*, Feb. 1985, p. 87.
Mahon, H. I. et al., "Hollow-Fiber Membranes," *Encyclopedia of Polymer Science*, vol. 15, p. 258.
Cabasso, Israel et al., "Polysulfone Hollow Fibers, I., Spinning and Properties," *Journal of Applied Polymer Science*, vol. 20, pp. 2377–2394.
Kordesch, K. V., "25 Years of Fuel Cell Development (1951–1976)," *Journal of the Electrochemical Society*, pp. 77C–91C.

*Primary Examiner*—John F. Niebling
*Assistant Examiner*—Nam X. Nguyen
*Attorney, Agent, or Firm*—Thomas K. McBride; Harold N. Wells

[57] ABSTRACT

Apparatus and method for performing an electrochemical process involving hydrogen and gaseous compounds capable of dissociating into or combining with hydrogen ions using a solid electrolyte concentraton cell. Specific applications are fuel cells for producing an electrical current and separation of hydrogen from a gaseous mixture. A novel solid electrolyte membrane is used which comprises a three-component blend prepared by admixing an organic polymer, such as poly(vinyl alcohol), with an inorganic comound, such as a phosphoric acid, and a polyorganic acid, such as poly(acrylic acid), in a mutually miscible solvent. For increased strength, a membrane may be composited with or attached to a porous support. In one embodiment, electrically conductive particles with catalyst are partially embedded in the membrane to form a hydrogen separating device.

17 Claims, 2 Drawing Sheets

HYDROGEN SEPARATION AND ELECTRICITY GENERATION USING NOVEL THREE-COMPONENT MEMBRANE

CROSS-REFERENCE TO RELATED APPLICATION

This is a continuation application of copending application Ser. No. 753,495, filed on July 10, 1985 abandoned.

FIELD OF THE INVENTION

This invention relates to an electrochemical process involving movement of protons through a membrane and applications thereof. More specifically, it relates to the use of a novel solid electrolyte and a catalyst in electrochemical processes such as producing electricity from hydrogen or gases capable of dissociating to yield hydrogen ions or in removing hydrogen from a gaseous mixture having a component capable of dissociating to yield hydrogen ions. The solid electrolyte may be formed by blending an inorganic compound, a poly organic acid, and an organic polymer or by compositing a membrane comprising these components with a porous support. This invention also involves the use of electrically conductive particles with catalyst partially embedded in the membrane for hydrogen separation.

INFORMATION DISCLOSURE

U.S. Pat. No. 4,024,036 (Nakamura et al.) describes a proton permselective solid state member capable of exhibiting ionic conductivity.

U.S. Pat. Nos. 3,265,536 (Miller et al.), 4,306,774 (Nicholson), 3,276,910 (Grasselli et al.), and 4,179,491 (Howe et al.) deal with substances capable of conducting hydrogen ions.

An article by Lundsgaard et al. (Solid State Ionics 7, 1982, North-Holland Publishing Co.) describes experiments done using a substance which conducts hydrogen ions.

A survey article on the separation of hydrogen may be found in the October 1983 *Platinum Metals Review*, produced by Johnson Matthey, London. Membrane separation systems are treated on page 63 and following of the July 13, 1981 issue of *Chemical Engineering* and also in an article starting on page 87 of the February 1985 issue of *Hydrocarbon Processing*.

A selection of U.S. patents dealing with hydrogen separation are U.S. Pat. Nos. 4,313,013 (Harris), 2,824,620 (de Rosset), 2,958,391 (de Rosset), 3,499,265 (Langley et al.), and 3,401,099 (McEvoy).

A survey article on hollow fiber membranes may be found in *Encyclopedia of Polymer Science*, Vol. 15, p. 258. Other references of interest in regard to fabrication of hollow fibers are U.S. Pat. No. 3,724,672 (Leonard et al.) and an article in *Journal of Applied Polymer Science*, Vol. 20, p. 2377, John Wiley & Sons.

A survey article on fuel cells may be found in *Journal of the Electrochemical Society*, March, 1978, p. 77C.

BRIEF SUMMARY OF THE INVENTION

The present invention provides methods and apparatus for hydrogen separation and electricity production. A novel solid electrolyte membrane is used in the present invention. We have discovered that a thin film polymer-blend membrane may be fabricated from an admixture of an inorganic compound, such as sulfuric acid or a phosphoric acid, with an organic polymer and a poly organic acid, where the three components are at least partially compatible. This membrane is capable of acting as a proton conductor in a fuel cell or hydrogen separation system where a hydrogen compound yields protons on one side of the membrane, protons are transported through the membrane, and protons are combined with a substance on the other side.

In addition, the composition of matter utilized for said membrane may be composited on a porous support to form a composite membrane which possesses increased strength as well as being a protonic conductor. Examples of material used for such porous support include glass cloth, polysulfone, and ceramics.

The invention utilizes a concentration cell whose electrolyte is said membrane or composite membrane. A membrane is mounted in a membrane housing having a first gas chamber and a second gas chamber, which chambers are separated by a partition comprising the membrane. The membrane must be substantially imporous so that gases will not mix by diffusing through it. Temperature of the gas or gases and/or the membrane housing may be controlled at a previously established value. A portion of catalytic agent for promotion of dissociation or combination is in intimate contact with the membrane on the membrane surface in common with the first gas chamber and also on the surface exposed to the second gas chamber. It is not necessary that the same catalytic agent be used on both sides. Means for forming electrical contact and transferring electrons to and from an external circuit are provided on each side of the electrolyte in intimate contact with catalytic agent. The catalytic agent may be platinum, palladium, or alloys thereof. The catalytic agent may be electrically conductive.

The method of a broad embodiment of the invention may be summarized as a method for accomplishing an electrochemical process involving a gaseous mixture having a component which is capable, in the presence of a catalytic agent, of dissociating to yield hydrogen ions, such method comprising contacting said gaseous mixture with a first surface of a thin film polymer-blend membrane and forming an electrical connection between two separate portions of catalytic agent effective to promote dissociation and combination, where a first portion of catalytic agent is in contact with said first surface and a second portion of catalytic agent is in contact with a second surface of said membrane, which membrane isolates said gaseous mixture from a second gas comprising hydrogen compounds formed at said second portion of catalyst, and which membrane has said second surface exposed to the second gas, said membrane comprising a blend of three components, which components are an organic polymer, a poly organic acid, and an inorganic compound selected from the group consisting of phosphoric acids, sulfuric acid, heteropoly acids, and salts of heteropoly acids, the poly organic acid being selected from the group of polymers and copolymers having monomer units of acrylic acid, methacrylic acid, and styrene sulfonic acid, and the organic polymer and the poly organic acid being compatible with the inorganic compound.

It is among the objects of the present invention to provide an improved fuel cell utilizing a fuel gas comprising hydrogen or a gaseous component capable of dissociating into hydrogen ions. The first and second chambers of the membrane housing serve as a fuel gas chamber and an oxidant gas chamber. The fuel gas chamber contains a gas comprising hydrogen or a component capable of dissociating to form hydrogen ions. In the other chamber is an oxidant gas, such as a gas comprising oxygen, which combines with hydrogen ions which have passed through the membrane.

It is also among the objects of the present invention to provide methods and apparatus of separating hydrogen from a gaseous mixture containing hydrogen or a component capable of dissociating to yield hydrogen ions. Practice of the invention may be viewed as resulting in purification of the mixture by removal of hydrogen, purification of hydrogen, or addition of hydrogen to another gas. The first and second chambers of the membrane housing serve as a pure gas chamber and a mixture gas chamber. The term pure gas, as used herein, means hydrogen separated from the gas mixture along with whatever gas, if any, is in the pure gas chamber with the separated hydrogen.

The membrane may be in the form of tubing, or hollow fibers, having electrically conductive particles embedded in it such that each particle is exposed to the atmosphere existing both on the exterior and interior of the tubing. A gaseous mixture is contained on the inside of the tubing and pure gas is on the outside, isolated from the gaseous mixture by the tubing wall. Alternatively, gaseous mixture may be on the outside and pure gas on the inside. A catalytic agent for promotion of dissociation or combination is in intimate contact with the particles on both sides of the membrane. It is not necessary that the same catalytic agent be used on both sides. The electrically conductive particles replace the external circuit of the concentration cell; that is, electrons from the gaseous mixture side of the tubing travel through the particles to combine with hydrogen ions passing through the membrane at the catalyst on the surface of the particles in common with the pure gas side of the membrane. Such particles may also be utilized with a flat membrane.

BACKGROUND OF THE INVENTION

The present invention utilizes a solid electrolyte membrane in separation of hydrogen and production of electricity (a fuel cell). The Nernst equation describes the behavior of such a system, as follows. When two media with different partial pressures, $P_1$ and $P_2$, of a particular substance present in both media are separated by a solid electrolyte (ionic conductor) and conducting electrodes are attached to both sides of the ionic conductor, an EMF is generated which is related to the partial pressures as follows:

$$\text{EMF} = E_o + \frac{RT}{nF} \ln \frac{P_2}{P_1},$$

where R is the gas constant, T is absolute temperature, F is the Faraday constant, $E_o$ is the standard oxidation-reduction potential difference, EMF is electromotive force, and n is the number of electrons per molecule of product from the overall cell reaction.

If the system described by the above equation behaves nonideally, the partial pressures must be replaced by fugacities. Another factor which may need to be considered in regard to a particular system is the rate of dissociation to form the ions which pass through the solid electrolyte. This may be a limiting factor to the transfer of ions through the electrolyte. The rate of dissociation can be calculated by means of the equilibrium constant for the dissociation reaction.

In a majority of cases, the admixture of an organic compound, especially in a polymeric state, with an inorganic compound, results in a phase separation due to the fact that the two systems are immiscible in nature. However, we have discovered that a thin film polymer-blend membrane may be fabricated by admixing the organic and inorganic components discussed herein; the resulting substance is not merely a physical mixture but exhibits a degree of interaction, that is, some amount of chemical interaction exists. Substances which are permeable by gases in a selective manner are known and utilized in a variety of applications. A membrane formed in accordance with the present disclosure is substantially impermeable to ions and gases, including hydrogen gas, but does allow hydrogen ions to pass through it. It should be noted that the membrane is not expected to be totally impermeable and that substances in addition to hydrogen ion may pass through it. Permeability experimentation has not been done, except to the extent indicated herein. For background information relating to the principles of the present invention, reference may be made to the book *Solid Electrolytes and Their Applications*, edited by Subbarao, Plenum Press, 1980.

Low mechanical strength has been a common problem when attempting to apply permselective membranes. The present invention provides a membrane whose mechanical strength is increased by compositing it with other materials, but whose desirable properties are not lost as a result of doing so.

In a simple hydrogen-oxygen fuel cell, the fuel gas is hydrogen and the oxidant gas is oxygen. Hydrogen dissociates into hydrogen ions and electrons at the catalyst on the fuel gas side of the membrane. The hydrogen ions pass through the electrolyte element while the electrons flow through the external circuit, doing electrical work before forming water by combining with, at the catalytic agent on the oxidant gas side of the membrane, hydrogen ions which passed through the membrane and oxygen. A flow of gases is normally maintained for continuous operation of the fuel cell. The maximum voltage which can be produced by a fuel cell is a thermodynamic function of the fuel and oxidant. For a hydrogen-oxygen fuel cell, the theoretical EMF is 1.23 volts. The actual voltage will be less due to losses within the cell. The current produced is controlled by such considerations as the rate at which the electrochemical reactions proceed, the electrolyte thickness, and the catalyst surface area. In a simple hydrogen-oxygen cell, the partial pressure term of the Nernst equation becomes partial pressure of water divided by the quantity partial pressure of hydrogen times square root of partial pressure of oxygen.

When producing hydrogen by means of the electrochemical process of this invention, the amount produced is generally in accordance with the parameters discussed above: the Nernst equation and, where applicable, the dissociation equilibrium constant. The rate at which separation takes place may be increased by adding means to generate an EMF to the external circuit. That is, a difference in partial pressures is sufficient to provide the driving force for hydrogen ion transport through the membrane, but applying an externally generated driving force will increase hydrogen ion flux. In the practice of all embodiments of this invention, it should be noted that exact adherence to theoretical relationships is not required of commercially used methods and apparatus.

DETAILED DESCRIPTION OF THE INVENTION

Figure 1:
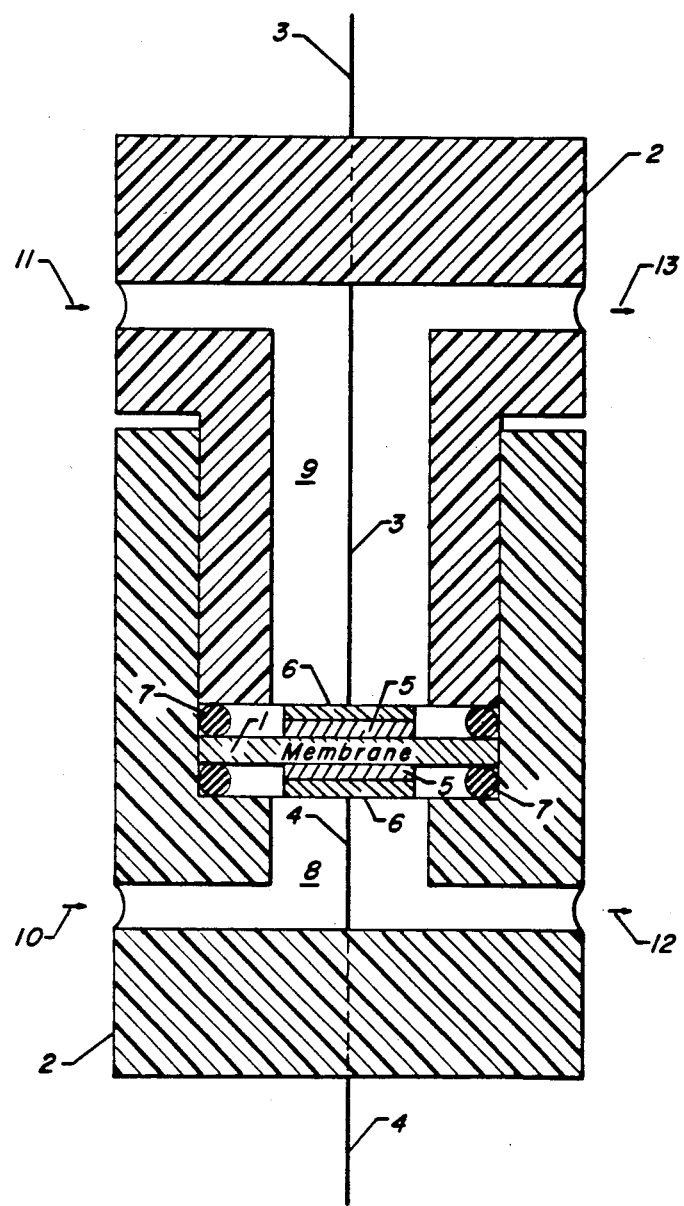
FIG. 1 is a schematic representation, in cross-section, of a test sensor similar to that used in initial proof of principle experimentation. The drawing is not to scale.

As was mentioned above, in attempting to blend an organic polymer with an inorganic compound, the usual result is to obtain a phase separation. It has now been discovered that a useful blend of components may be obtained, by admixing certain organic polymeric compounds with particular inorganic compounds, such as certain inorganic acids or salts thereof, and with certain organic poly acids. The resulting composition of matter is formed into a thin film membrane which may be utilized in electrochemical systems. The utility of these membranes in gas separation devices and fuel cells is due in part to the fact that the membranes will possess a high protonic conductivity, especially at room or ambient temperature. The membranes will also exhibit an increase in tensile strength in addition to their excellent transport properties when compared to those membranes which are prepared from pure organic polymers.

Usually, high conductivity is observed in polymer complexes only when the temperature is above the glass transition temperature (Tg), that is, above the temperature at which the substance changes from a solid to a liquid (the melting point of a polymer is usually above its glass transition temperature). Indications of the change of a polymer from solid to liquid are abrupt changes in certain properties, such as coefficient of expansion and heat capacity. The polymer-blend compositions of the present invention exhibit high protonic conductivity at temperatures well below the observed glass transition temperatures of the individual homopolymers. A device utilizing an ion-conducting polymer must operate below the Tg of the polymer; the polymer is not usable at higher temperatues due to loss of strength, tackiness, etc. A polymer-blend of the preferred composition, described below, exhibited two glass transition temperatures, which are attributable to the polymers but occur at different values than the glass transition temperatures determined for each polymer when it is not mixed with any other substance. In addition, at a relatively low temperature, a second order transition is observed; this is attributable to the inorganic compound. Thus, it may be appreciated that there is a degree of interaction between the components, that is, at least some chemical interaction exists between the components.

A distinct advantage which is possessed by the polymer-blend membranes of the present invention over other organic-inorganic blend membranes is that these membranes possess low resistivities (resistance times area divided by thickness), which are four to five orders of magnitude less than the other organic-inorganic polymer blends.

The membrane comprises a blend of an organic polymer, a poly organic acid, and certain inorganic compounds, the organic polymer and poly organic acid being at least partially compatible with the inorganic compound used. The poly organic acid is selected from a group of polymers and copolymers having monomer units of acrylic acid, methacrylic acid and styrene sulfonic acid.

Examples of organic polymers which may be employed as one component of the blend of the present invention will include poly(vinyl alcohol), also known as PVA, poly(vinyl fluoride), polyethylenimine, polyethylene glycol, cellulose acetate, polyvinylmethylethyl ether, phenol formaldehyde resins, etc., and copolymers thereof, such as PVA-poly(vinyl fluoride).

The inorganic compound is selected from a group consisting of a phosphoric acid, sulphuric acid, heteropoly acids, or salts of heteropoly acids. Examples of phosphoric acids which may be employed will include hypophosphoric acid, metaphosphoric acid, orthophosphoric acid, pyrophosphoric acid, polyphosphoric acid, etc. The sulfuric acid which is employed will comprise an aqueous sulfonic acid which may contain from about 10% to about 40% sulfuric acid in the aqueous solution. Examples of heteropoly acids or salts thereof which may be employed as a component of the organic-inorganic blend which may be used to form a membrane will possess the generic formula:

$$A_m(X_x Y_y O_z) \cdot n H_2O$$

in which X is selected from the group consisting of boron, aluminum, gallium, silicon, germanium, tin, phosphorus, arsenic, antimony, bismuth, selenium, tellurium, iodine, and the first, second, third and fourth transitional metal series, said series including scandium, yttrium, lanthanum, actinium, titanium, zirconium, hafnium, vanadium, niobium, tantalum, chromium, molybdenum and tungsten, Y is different from X and is selected from the first, second, third, or fourth transitional metal series, A is selected from the group consisting of hydrogen, ammonium, sodium, potassium, lithium, rubidium, cesium, beryllium, magnesium, calcium, strontium and barium, m is an integer of from 1 to 10, y is an integer of from 6 to 12 based on x taken as 1, z is an integer of from 30 to 80 and n is an integer of from 3 to 100.

Specific examples of these compounds will include dodecamolybdophosphoric acid (DMPA), ammonium molybdophosphate, sodium molybdophosphate, potassium molybdophosphate, lithium molybdophosphate, calcium molybdophosphate, magnesium molybdophosphate, dodecatunstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, etc.

It is also contemplated within the scope of this invention that some uranyl compounds may also be employed heteropoly acid or salt thereof. These uranyl compounds will possess the generic formula:

in which A is selected from the group consisting of hydrogen, lithium, sodium, potassium, ammonium, copper, magnesium, calcium, barium, strontium, lead, iron, cobalt, nickel, manganese, and aluminum, X is selected from the group consisting of phosphorus and arsenic and n is an integer of from 1 to 4. Some specific examples of these uranyl compounds will include uranyl orthophosphate (HUOP), uranyl orthoarsenate, lithium uranylphosphate, lithium uranylarsenate, sodium uranylphosphate, sodium uranylarsenate, potassium uranylphosphate, potassium uranylarsenate, ammonium uranylphosphate, ammonium uranylarsenate, calcium uranylphosphate, calcium uranylarsenate, barium uranylphosphate, barium uranylarsenate, copper uranylphosphate, copper uranylarsenate, iron uranylphosphate, iron uranylarsenate, cobalt uranylphosphate, cobalt uranylarsenate, nickel uranylphosphate, nickel uranylarsenate, etc.

It is to be understood that the aforementioned components are only representative of the class of inorganic compounds which make up the membrane blends used in the present invention and this invention is not necessarily limited thereto.

The novel compositions of matter used in the present invention are prepared by admixing the three components of the blend in a mutually miscible solvent at solution conditions for a period of time sufficient to form the desired blend. In the preferred membrane the mutually miscible solvent which is employed to dissolve the components comprises water, although it is contemplated within the scope of this application that any other mutually miscible solvent, either inorganic or organic in nature may also be employed. The mixing of the three components of the composition of matter may be effected at solution conditions which will include a temperature in the range of from about ambient (20°–25° C.) up to the boiling point of the mutually miscible solvent which, for example, in the case of water is 100° C. As an example, poly(acrylic acid), poly(vinyl alcohol), and orthophosphoric acid may be placed in a flask and dissolved in water which has been heated to 100° C. The time of reaction which is necessary to form the desired blend will vary with the particular organic polymers and inorganic compounds as well as the solvent and may be within a period of time ranging from about 0.5 up to about 10 hours or more in duration. Upon completion of the reaction period, the blend is cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaporation by the application of elevated temperatures, whereby said solvent is evaporated and the desired membrane comprising a thin film of the polymeric blend is formed. The thickness of the film can be controlled by the amounts of the various components of the blend which are present in the reaction mixture or by the depth of the casting vessel. The thin film organic-inorganic blend which is prepared according to the process of the present invention will possess a thickness which may range from about 0.1 to over 100 microns and preferably from about 20 to about 60 microns.

The amounts of inorganic compound, organic polymer, and poly organic acid used in the blend may vary over a relatively wide range. For example, the inorganic compound which comprises a phosphoric acid, sulfuric acid, heteropoly acid or salts thereof may be present in the blend or membrane in a range of from about 1 to about 49 mole percent, the organic polymer may be present in the blend or membrane in a range of from about 50 to about 94 mole percent, and the poly organic acid may be present in the blend or membrane in a range of from about 1 to about 49 mole percent. When compositions of blends falling within these ranges are depicted on a ternary diagram, they will be approximately within a triangle formed by connecting points representing the following three compositions:

| Inorganic | Organic Polymer | Poly Organic Acid |
|---|---|---|
| 49 | 50 | 1 |
| 5 | 94 | 1 |
| 1 | 50 | 49 |

Compositions falling outside this triangle on the ternary diagram were not as satisfactory for the contemplated uses of the blend as those falling within. Whenever a composition is expressed herein, it is to be understood that it is based, in the case of polymers, on the monomer repeat unit.

Three different blends were made and tested. Each of the three contained PVA and orthophosphoric acid. The other components used to make the three different blends were PAA, poly(methacryclic acid), and poly(styrene sulfonic acid). The PVA/orthophosphoric/PAA blend was determined to be best suited for use in the present invention and other applications and all further work was done with that blend. Upon further testing, it appeared that a blend having a mole ratio of 5 to 1 to 4 PVA to PAA to orthophosphoric acid is preferred. This 50% PVA, 10% PAA, 40% acid blend had the lowest resistivity of any of the blends tested.

Some representative examples of a thin film polymer blend membrane which may be prepared will comprise orthophosphoric acid-poly(vinyl alcohol)poly(acrylic acid), pyrophosphoric acid-poly(vinyl alcohol)-poly(acrylic acid), sulfuric acid-poly(vinyl alcohol)-poly(acrylic acid), dodecamolybdophosphoric acid-poly(vinyl alcohol)-poly(acrylic acid), dodecatungstophosphoric acid-poly-(vinyl alcohol)-poly-(acrylic acid), dodecamolybdosilicic acid-poly(vinyl alcohol)-poly(acrylic acid), ammonium molybdophosphate-poly(vinyl fluoride)-poly(acrylic acid), uranyl orthophosphate-poly(vinyl fluoride)-poly(acrylic acid), orthophosphoric acid-poly(vinyl alcohol)-poly(methacrylic acid), pyrophosphoric acid-poly(vinyl alcohol)-poly (methacrylic acid), sulfuric acid-poly(vinyl alcohol)-poly(methacrylic acid), dodecamolybdophosphoric acid-poly(vinyl alcohol)-poly(methacrylic acid), dodecatungstophosphoric acid-poly(vinyl alcohol)-poly(methacrylic acid), dodecamolybdosilicic acid-poly(vinyl alcohol)-poly(methacrylic acid), ammonium molybdophosphate-poly(vinyl alcohol)-poly(methacrylic acid), uranyl orthophosphate-poly(vinyl alcohol)-poly(methacrylic acid), orthophosphoric acid-poly(vinyl alcohol)-poly(styrene sulfonic acid), pyrophosphoric acid-poly(vinyl alcohol)-poly(styrene sulfonic acid), dodecamolybdophosphoric acid-poly(vinyl alcohol)-poly(styrene sulfonic acid), dodecatungstophosphoric acid-poly(vinyl alcohol)-poly(styrene sulfonic acid), dodecamolybdosilicic acid-polyethylene glycol-poly(styrene sulfonic acid), ammonium molybdosulfate-cellulose acetate-poly(styrene sulfonic acid), uranyl orthophosphate-poly(vinyl alcohol)-poly(styrene sulfonic acid).

It is to be understood that the aforementioned list of polymer blends is only representative of the class of polymer blended membranes which may be prepared and that the invention is not necessarily limited thereto.

It will be helpful in gaining an understanding of the invention to examine initial proof of principle experimentation. The information presented in regard to this experimentation is not meant to limit the scope of the invention in any way. This experimentation was directed to obtaining information on gas detection, as well as the specific applications described above.

Three stock solutions were prepared by dissolving 10 grams of poly(vinyl alcohol) having a molecular weight of 133,000 in 500 ml of deionized water; 5 grams (20 ml) of poly(acrylic acid) having a molecular weight of 90,000 was dissolved in 250 ml of deionized water and 14.7 grams (10 ml) of 14.45 Molar orthophosphoric acid was dissolved in 100 ml of deionized water. To prepare a novel polymer blend membrane of the present invention, 12.5 ml of stock poly(vinyl alcohol) solution, 4.1 ml of stock solution of poly(acrylic acid) and 3.1 ml of a stock solution of orthophosphoric acid were thoroughly admixed, the mole ratio of the resulting blend being 5:1:4 moles of poly(vinyl alcohol) to poly(acrylic acid) to orthophosphoric acid. The molecular weight of the PVA was 133,000. Commercially available PVA of molecular weight 3,000 or 76,000 could have been used. The solution was then poured into an evaporation dish and the water was allowed to evaporate at room temperature for a period of 16 hours. The resulting film was transparent and possessed a thickness of about 50 microns.

This thin film membrane was cut into a disc having a 1" diameter to form membrane 1 of FIG. 1 and platinum was sputter-deposited onto each side of the disc for a period of about 5 minutes per side. The platinum deposits each had a thickness of about 400 Angstroms and an area of about 1 square cm. Deposition was accomplished by means of a Hummer II sputter deposition system supplied by Technics Co. A biased screen between the target and film was used to reduce the electron flux to the membrane. There are many alternative methods which could have been used to form the platinum deposits, such as thermal evaporation or deposition by means of an ink. The porous structure of sputter-deposited catalytic agent is helpful in facilitating spillover of hydrogen ions onto the membrane, but such structure is not required.

Referring to FIG. 1, membrane 1 was mounted in test fixture 2, which may also be referred to as a sample cell, membrane housing, or test sensor. The above mentioned platinum deposits 5 served as catalytic agent to promote dissociation and reassociation or combination. Electrical contact was made to the platinum through cooper platens 6, which were held in place by springs (not shown) extending between the platens and interior surfaces of the sample cell. Platens 6 did not cover the entire surface of the catalytic agent, though FIG. 1 shows this to be the case. Note that when the catalytic agent is electrically conductive and not discontinuous, electrical contact need be made only at one point, the catalytic agent thus serving as an electrode. Wire leads 3 and 4 extended from the platens out of the test fixture through means for sealing against gas leakage (not shown). Leads 3 and 4 were connected to EMF and current detection means (not shown). Membrane 1 was sealed into test fixture 2 by O-rings 7 so that there were no gas leakage paths between first gas chamber 8 and second gas chamber 9. In a fuel cell embodiment, these chambers are denoted fuel gas chamber and oxidant gas chamber, while in a hydrogen separation embodiment, they are called pure gas chamber and mixture gas chamber. Tubing (not shown) was connected at the gas inlets as denoted by arrows 10 and 11 to provide gas flow into chambers 8 and 9 and was also connected to the gas outlets as denoted by arrows 12 and 13 to conduct gas away from the chambers. Gas-containing cylinders and gas flow control apparatus (not shown) were used to provide gas to test the sensor of fixture 2 in accordance with the herein described experiments. Several cylinders of hydrogen/nitrogen gas mixtures were purchased; an analysis (which was not checked) of the contents was supplied with each cylinder.

Gas flows were established through the chambers of the sample cell with both chamber pressures at about one atmosphere, since the chambers were vented directly to atmosphere by means of a short length of tubing. One flow was pure hydrogen (hydrogen partial pressure of 1.0 atm.) and the other was alternated between pure hydrogen and a 10% by volume mixture of hydrogen in nitrogen (hydrogen partial pressure of 0.1 atm.). The voltage across wires 3 and 4 was recorded by means of a standard laboratory strip chart recorder. When the flow to one chamber was alternated at a constant rate, the voltage versus time plot was a substantially perfect square wave form. If the speed of the recorder chart was increased, the approaches to the horizontal lines representing a steady-state condition changed to a rounded corner configuration, in contrast to the sharp corner of the square wave at a slower speed; this is due to the time required to flush out the sample cell. Voltage varied consistently between 0.0 millivolts and 29.1 mv. Response was Nernstian; the calculated voltage is also 29.1 mv (at a room temperature of about 22° C.). Note that this is open circuit voltage. The test was continued for 30 days, with the sample gas alternating between pure hydrogen and 10% hydrogen every 20 minutes. Voltage deviation from theoretical was less than about 1%.

When the gases (100% hydrogen and 10% hydrogen) were continuously flushed through the cell with no alternations for a period of 24 hours, the voltage remained at 29.1 mv for the duration of the test period. Upon connection of an ammeter to wires 3 and 4, the measured current was 1.5 ma at the beginning of the test period and 0.0676 ma after 24 hours. The decrease in current flow over the test period is due to removal of water from the membrane, since the membrane was not completely dry. Current flow stabilized at the latter value. The resistance of the membrane was measured when 100% hydrogen was flowing through both chambers of the sample cell. It was about 200 ohms for a 50 micron thick membrane with 1 cm$^2$ of platinum on each surface, corresponding to a resistivity of 40,000 ohm-cm. This applies to a totally dry membrane. When a membrane which was not completely dry was placed under test, the initial resistance was lower. When one or both of the gas streams were bubbled through water before passing through the test cell, the measured voltage was unchanged, but the closed circuit current was 18 ma. This corresponds to a current density of about 18 ma/cm$^2$ and a hydrogen flux of 0.24 ft$^3$/ft$^2$- hr; both figures being based on the area of the membrane covered by platinum.

Other membranes prepared from the above-mentioned stock solutions were tested after sputter deposition of platinum. Voltage response was always Nernstian, but current flow varied approximately plus or minus 50% from the closed circuit value presented above for a dry membrane.

In another test with a reference gas of pure hydrogen, a concentration of hydrogen, expressed as partial pressure, was calculated using the Nernst equation. Partial pressures are expressed in atmospheres.

| P.P. Sensor | P.P. Analysis |
|---|---|
| 1.04 | 1.0 |
| 0.10 | 0.10 |
| 0.0012 | 0.001 |

In experimentation with the fuel cell application using a PAA/PVA/orthophosphoric acid membrane with air as the oxidant gas and pure hydrogen as the fuel gas, open circuit voltages consistently in the range of 900 mv were observed. Current density (closed circuit) was about $18 \times 10^{-3}$ amp/cm$^2$. Open circuit voltage behavior is excellent; a typical hydrogen-oxygen fuel cell will display values from 0.6 to 0.85 volts at room temperature. If pure oxygen had been used as an oxidant gas instead of air, the open circuit voltage would have been higher. No attempts were made to optimize performance.

In addition to platinum, palladium may be deposited on membranes for use as catalytic agent. Nernstian voltage response will be observed when palladium is used. Other catalytic agents are available and known to those skilled in the art. The catalytic agent need not be electrically conductive; however, then the means for forming electrical connection must be in contact with the catalytic agent over a broad area to facilitate movement of electrons from sites of the catalytic agent to the electrically conductive substance or electrode. Alternatively, catalyst may be embedded in a conductive matrix. Areas of membrane which are not adjacent to catalytic agent are not effective in the invention. Hydrogen ions spill over from the catalytic agent to the membrane and then the protons move through the membrane.

Membranes of the present invention have been tested at temperatures ranging from minus 70° C. to plus 50° C. Nernstian behavior was observed though, of course, voltage varies with temperature. It may be possible to use these membranes at higher temperatures, but no tests have been conducted.

It can be seen that a membrane mounted in a cell such as depicted in FIG. 1 may be subjected to high differential pressures which may deform or burst the membrane. A composite membrane may be fabricated by casting a solution prepared as described above on a flexible porous support. A supported membrane assembly may be fabricated by attaching a membrane which is cast and dried as above to a rigid porous support. In the case of a PAA/PVA/H$_3$PO$_4$ membrane, attachment is accomplished by moistening the surface of the membrane and support and pressing the moistened surfaces together. The moisture will evaporate.

It is contemplated that any porous substrate which possesses a structural strength greater than the thin film membrane may be employed. Some examples of these porous supports will include compounds such as glass cloth, polysulfone, cellulose acetate, polyamides, ceramics such as alumina, glass, porcelain, etc. which have been fabricated to possess the necessary porosity. The amount of blend which is cast upon the flexible porous support will be that which is sufficient to form a thin film membrane having a thickness within the range herein set forth. After casting, the mutually miscible solvent such as water is removed by conventional means such as normal evaporation or forced evaporation by the application of external heat, application of vacuum, etc., and the desired membrane comprising the thin film blend composited on the porous support may be recovered and utilized in an appropriate apparatus.

A polymer blend was prepared using the above-mentioned stock solutions, the amounts of polymers and acid being sufficient to impart a 5/1/4 mole ratio to the resulting dry polymer blend. After a period of time sufficient to form the blend had passed, the solution was stirred and poured onto the top of a fine glass cloth which was positioned in a standard Petri dish. The water was allowed to evaporate for a period of 48 hours and the resulting membrane composite comprising a thin film membrane composited on, or with, the glass cloth having a thickness of 95 microns was recovered.

The PVA/H$_3$PO$_4$/PAA composite membrane was cut into a circle having a 1" diameter and platinum electrodes 1 square cm in area were sputter-dispersed on each side of the membrane. The membrane was then placed in a sample housing similar to that of FIG. 1 for test. The sensor response was Nernstian. However, the resistivity was higher.

As an illustration of the greater structural strength of a polymer blend composited on a porous solid support when compared to unsupported membranes, reference may be made to previous work involving two component polymer blend membranes. Two polymer blend membranes were prepared. The polymer blend was prepared by dissolving 0.5 gram of poly(vinyl alcohol) having a molecular weight of 16,000 and 0.2 ml of orthophosphoric acid in boiling deionized water. The resulting blend was cast onto a glass cloth having a thickness of 30 microns. A second blend was prepared by admixing like proportions of poly(vinyl alcohol) and orthophosphoric acid and casting the resulting blend onto a Petri dish without a support. After removal of the solvent, the two membranes were recovered.

Each membrane was placed in a holder which enabled air pressure to be exerted against one side of the membrane while the other side was at atmospheric pressure. When exposed to 5 psig, the unsupported membrane burst at its center in less than 1 minute. At 2 psig another sample of unsupported membrane bulged and was permanently deformed. The composite membrane was subjected to various pressure levels in 5 psig increments with one minute hold time between increases in pressure. It burst at 35 psig, shearing at the edges of the test hole in the holder. The point of failure leads one to believe that holder design caused the shearing and that a higher burst pressure would be observed in a different holder.

Any substance capable of dissociating in the presence of a catalyst to yield hydrogen ions may be the subject of separation in the same manner as is elemental hydrogen. The Nernst equation is applicable; the $E_o$ term is not 0, as it is when the same substance is present on both sides of the membrane, and the partial pressure term of the equation contains the partial pressures of the substances of the reaction, raised to the proper power if more than one molecule of a substance is involved. As examples, certain hydrocarbons come readily to mind as substances which may be hydrogenated or dehydrogenated, these hydrocarbons including cyclopentadiene, 1,3-pentadiene, isoprene, benzene, 2-butene-1,4-diol, n-hexane, cyclohexane, and isoamylene.

In the embodiment of the invention depicted in FIG. 1, when test fixture 2 is used for gas separation, it is necessary that lead 3 be connected to lead 4 by an electrical conduction path. This path permits the electrons resulting from the dissociation of hydrogen (or other gaseous mixture component) at one catalyst portion 5 to travel to the other side of the membrane to combine at the other catalyst portion with hydrogen ions which have passed through the membrane. If means for generating an EMF are inserted into the electrical conduction path, that is, if electrical power from a source external to the separation apparatus is supplied to the apparatus through the means for forming electrical connection such as leads 3 and 4, the rate of removal of hydrogen from the gaseous mixture will increase.

For a practical separation process, the partial pressure of hydrogen in the chamber from which hydrogen is removed, the mixture gas chamber, must be higher than the partial pressure of hydrogen in the chamber in which hydrogen collects after removal, the pure gas chamber. In an industrial application of the invention, a compressor might be used to compress the gaseous mixture from which hydrogen is to be removed, maintaining the hydrogen partial pressure in the mixture gas chamber higher than that in the pure gas chamber. The partial pressure of hydrogen increases as the total pressure is increased. The pure gas chamber might be subjected to a negative pressure, or vacuum, thus removing hydrogen as it collects, or forms. The references to hydrogen partial pressure deal with a case in which hydrogen is the gaseous mixture component which dissociates to form hydrogen ions. If the component is not hydrogen, the equilibrium hydrogen partial pressure associated with the gaseous mixture component must be at a higher value than the partial pressure of hydrogen in the pure gas chamber, where the product gas comprising hydrogen is collected.

It should be noted that the Nernst equation contains a temperature term. Since temperature is a factor in the separation it may be desirable to change the temperature of the gases before the electrochemical reaction takes place.

Figure 2:
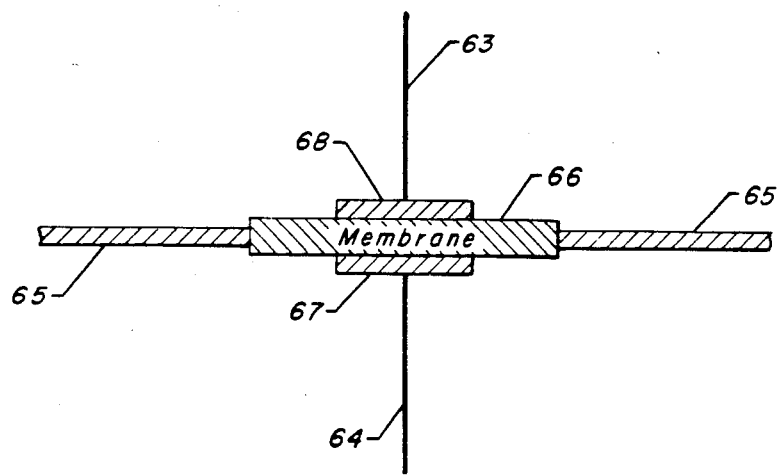
FIG. 2 depicts an embodiment of the invention, in a sectional view, in which a membrane is part of a partition separating a fuel gas chamber from an oxidant gas chamber or a pure gas chamber from a mixture gas chamber.

Referring to FIG. 2, an embodiment of the invention in which a membrane 66 serves as part of partition 65 is shown. Partition 65 separates a mixture gas chamber from a pure gas chamber. Catalytic agents 67 and 68 and wire leads 63 and 64 perform the functions discussed above. Leads 63 and 64 must be connected to one another. Separation apparatus may take many forms; FIG. 2 shows a simple and basic form. A cascade arrangement might be used, in which the gaseous mixture is compressed and then allowed to flow through a plurality of mixture chambers, each at a lower pressure.

The design of fuel cells is well known. Many configurations are possible; FIG. 1 provides an example of one type. FIG. 2 depicts an embodiment of the present invention useful in producing electricity as well as in separation. Partition 65 separates a fuel gas chamber from an oxidant gas chamber. Electrically conductive catalytic agent is present on both sides of membrane 66, as shown by reference numbers 67 and 68. Wire leads 63 and 64 extend to connect to electricity utilizing means (not shown).

Figure 3:
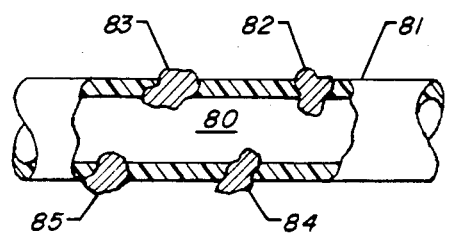
FIG. 3 depicts tubing and particles of one embodiment of the invention in a partial sectional view. It is not to scale.

It may be desirable to use a membrane in the form of tubing, or hollow fibers, instead of in a flat configuration. The advantages are well known to those familiar with such applications and need not be repeated herein. In the embodiment of the invention depicted in FIG. 1, when test fixture 2 is used for gas separation, it is necessary that lead 3 be connected to lead 4 by an electrical conduction path. This path permits the electrons resulting from the dissociation of hydrogen (or other gaseous mixture component) at one catalyst portion 5 to travel to the other side of the membrane to combine at the other catalyst portion with hydrogen ions which have passed through the membrane. It can be seen that certain problems arise in regard to the external circuit and catalyst when it is desired to use tubing rather than a flat membrane. FIG. 3 depicts an embodiment of the invention which solves these problems. A very short section of a hollow fiber, or portion of a single tube, is shown. Electrically conductive particles are contained in and form a portion of the tubing wall, as shown by particles 82, 83, 84, and 85. Each particle has catalytic agent in contact with it. FIG. 3 does not show the catalyst as a separate material. The catalyst material and particle material may be the same substance, such as platinum particles. The catalytic agent may cover only that surface of each particle which is exposed to the interior of the tubing, or in common with the interior surface of the tubing, and the surface which is in common with the exterior surface of the tubing, or exposed to the atmosphere exterior to the tubing. It may cover only a portion of said exposed surface. For the purpose of convenience in fabricating the apparatus, it may cover the entire surface of each particle. A gaseous mixture from which hydrogen is to be separated may be inside the tube in the space 80 or outside the tube, in contact with tube exterior surface 81. Pure gas is partitioned from the gaseous mixture by the tube walls. As discussed herein, the particles need not be formed into tubing but can also be used for hydrogen separation in the same manner as described above. A particle containing solution can be cast on an appropriate surface as described above.

The particles may be any electrically conductive material compatible with the gases which will bond to the membrane during manufacture of the tubing. Carbonaceous material or metals such as copper may be used. The catalyst material is as discussed above. The tubing may be fabricated by forcing a solution through a die while making provision for maintaining a hollow core, such as by injecting a gas or liquid. The solution is as discussed above. It is not necessary to detail manufacturing methods; these are well known to those skilled in the art, as shown by the above-referenced publications.

The particles may be added to the solution before the tubes are formed. Catalyst may be placed on the particles before or after the tubing is formed. For example, copper or carbon particles may be coated with platinum by adding chloroplatinic acid and decomposing to leave elemental platinum. Catalytic agent may be added by vapor deposition after the tubing has been formed.

Tubing of outside diameter of approximately 0.001 mm and larger may be formed. The outside diameter may be as large as one-half to one inch when tubing is formed by solution extrusion methods. Tubes may be formed from flat sheets of membrane. Tubes may also be formed over or inside of a support material, such as a perforated pipe or porous tubing. The wall thickness of the tubing will vary depending on the application. The primary consideration here is strength. A thicker wall is required as the operating pressure differential between inside and outside increases. Tubing is normally formed into bundles containing a plurality of separate tubes, means for supplying gaseous mixture and removing hydrogendepleted gaseous mixture, and means for supplying pure gas, if any is used, and removing hydrogen-rich pure gas. Such a bundle and accompanying supply and removal means is quite similar to the well-known shell and tube heat exchanger.

Sample cell of membrane housing or test fixture refers to a housing or fixture which holds an electrolyte element and other required components. FIG. 1 depicts a membrane housing. Membrane or electrolyte element refers to an ion-conducting substance suitable for use as an electrolyte in the concentration cell of this invention which has been formed into a particular physical entity, either with or without additional substances, for use in the invention. Where an electrolyte element surface is referred to as in common with a gas or gas chamber, the meaning is the same as exposed to a gas or gas chamber and such reference does not preclude the presence of catalytic agent and electrodes at or covering the surface. Gas may diffuse through covering material. Gas chamber refers to any space in which gas which is the subject of this electrochemical process exists. The term "gas" is used herein to include vaporized liquids regardless of boiling point characteristics of the substance. As used herein, miscible means capable of being mixed where there may only be a very small degree of solubility. As is familiar to those skilled in the art, the terms concentration and partial pressure are often used interchangeably; partial pressure expressed concentration. A gaseous mixture may be formed in the apparatus by the dissociation of hydrogen when a single compound is charged to the apparatus, such as in the dehydrogenation of a hydrocarbon. A fuel gas may have only one component or more than one. Compatible may be taken to mean that compatible compounds will form the polymer-blend composition of matter.

We claim as our invention:

1. Apparatus for performing an electrochemical process involving a gaseous mixture having a component which is capable, in the presence of a catalytic agent, of dissociating to yield hydrogen ions or of combining with hydrogen ions, comprising:

(a) a thin film polymer blend membrane possessing a high protonic conductivity and which is formed by removing the solvent from a solution of a blend of three components, which components are a phosphoric acid, an organic polymer, and a poly organic acid wherein said phosphoric acid is present in the blend in an amount in the range of about 10 to about 50 mol % and is selected from a group consisting of hypophosphoric acid, metaphosphoric acid, orthophosphoric acid, pyrophosphoric acid, and polyphosphoric acid, wherein said organic polymer is present in the blend in an amount in the range of about 80% to about 40 mol % and is selected from a group consisting of poly(vinyl alcohol), poly(vinyl fluoride), polyethylenimine, poly(ethylene glycol), cellulose acetate, and copolymers having as repeat units the monomer units used in the polymers of said group, and wherein said poly organic acid is present in the blend in an amount in the range of about 10 to 40 mol. % and is selected from a group consisting of poly(acrylic acid), poly(methacrylic acid), poly(styrene sulfonic acid), and copolymers having as repeat units the monomer units used in the poly organic acids of said group;

(b) a membrane housing comprising a first gas chamber and a second gas chamber separated by a partition comprising said membrane, said membrane having a first surface in common with the first gas chamber and a second surface in common with the second gas chamber;

(c) two separate portions of catalytic agent effective to promote dissociation and combination, a first portion in contact with said first surface and a second portion in contact with said second surface of said membrane; and, (d) means for forming electrical connection in operative contact with said catalytic agent at said first surface and with said catalytic agent at said second surface.

2. The apparatus of claim 1 further comprising means to supply fuel gas to one of said gas chambers and oxidant gas to the other of said gas chambers.

3. The apparatus of claim 1 further comprising means to supply said gaseous mixture to one of said chambers and to remove pure gas comprising hydrogen from the other of said gas chambers.

4. The apparatus of claim 1 further comprising means for generating an EMF connected between said means for forming electrical connection.

5. The apparatus of claim 1 further characterized in that said catalytic agent comprises a substance selected from a group consisting of platinum, palladium, and alloys thereof.

6. The apparatus of claim 1 further characterized in that said catalytic agent is electrically conductive.

7. The apparatus of claim 1 further characterized in that said catalytic agent is porous to said gaseous component.

8. The apparatus as set forth in claim 1 in which said membrane possesses a thickness of from about 0.1 to about 100 microns.

9. The apparatus as set forth in claim 1 in which said polymer comprises poly(vinyl alcohol), said acid comprises orthophosphoric acid, and said poly organic acid comprises poly(acrylic acid).

10. The apparatus as set forth in claim 1 in which said blend is composited with a flexible porous support.

11. The apparatus as set forth in claim 1 in which said polymer comprises poly(vinyl alcohol), said acid comprises orthophosphoric acid, and said poly organic acid comprises poly(methacrylic acid).

12. A method for accomplishing an electrochemical process involving a gaseous mixture having a component which is capable, in the presence of a catalytic agent, of dissociating to yield hydrogen ions, such method comprising contacting said gaseous mixture with a first surface of a thin film polymer-blend membrane possessing a high protonic conductivity and forming an electrical connection between two separate portions of catalytic agent effective to promote dissociation and combination, wherein a first portion of catalytic agent is in contact with said first surface and a second portion of catalytic agent is in contact with a second surface of said membrane, which membrane isolates said gaseous mixture from a second gas comprising hydrogen compounds formed at said second portion of catalyst, and which membrane has said second surface exposed to the second gas, said membrane comprising a thin film polymer blend membrane which is formed by removing the solvent from a solution of a blend of three components, which components are a phosphoric acid, an organic polymer, and a poly organic acid wherein said phosphoric acid is present in the blend in an amount in the range of about 10 to about 50 mol % and is selected from a group consisting of hypophosphoric acid, metaphosphoric acid, orthophosphoric acid, pyrophosphoric acid, and polyphosphoric acid, wherein said organic polymer is present in the blend in an amount in the range of about 80% to about 40 mol % and is selected from a group consisting of poly(vinyl alcohol), poly(vinyl fluoride), polyethylenimine, poly(ethylene glycol), cellulose acetate, and copolymers having as repeat units the monomer units used in the polymers of said group, and wherein said poly organic acid is present in the blend in an amount in the range of about 10 to 40 mol. % and is selected from a group consisting of poly(acrylic acid), poly(methacrylic acid), poly(styrene sulfonic acid), and copolymers having as repeat units the monomer units, used in the poly organic acids of said group.

13. The method of claim 12 further characterized in that said electrochemical process comprises producing electricity from a fuel gas comprising said gaseous mixture and an oxidant gas comprising said second gas.

14. The method of claim 12 further characterized in that said electrochemical process comprises separating pure gas comprising hydrogen from said gaseous mixture.

15. Apparatus for separation of hydrogen from a gaseous mixture having a component which is capable, in the presence of a catalytic agent, of dissociating to yield hydrogen ions, comprising:
 (a) tubing which is substantially imporous comprised of a thin film polymer blend membrane possessing high protonic conductivity and which is formed by removing the solvent from a solution of a blend of three components, which components are a phosphoric acid, an organic polymer, and a poly organic acid wherein said phosphoric acid is present in the blend in an amount in the range of about 10 to about 50 mol % and is selected from a group consisting of hypophosphoric acid, metaphosphoric acid, orthophosphoric acid, pyrophosphoric acid, and polyphosphoric acid, wherein said organic polymer is present in the blend in an amount in the range of about 80% to about 40 mol % and is selected from a group consisting of poly(vinyl alcohol), poly(vinyl fluoride), polyethylenimine, poly(ethylene glycol), cellulose acetate, and copolymers having as repeat units the monomer units used in the polymers of said group, and wherein said poly organic acid is present in the blend in an amount in the range of about 10 to 40 mol. % and is selected from a group consisting of poly(acrylic acid), poly(methacrylic acid), poly(styrene sulfonic acid), and copolymers having as repeat units the monomer units used in the poly organic acids of said group;
 (b) a multiplicity of electrically conductive particles contained in and forming portions of the walls of said tubing, each particle having a first surface exposed to the interior of said tubing and a second surface in common with the exterior surface of said tubing;
 (c) two portions of catalytic agent effective to promote dissociation and combination associated with each particle, one portion in contact with said first surface and one portion in contact with said second surface of each particle; and,
 (d) means to maintain said gaseous mixture in contact with one of said tubing surfaces and means to recover hydrogen formed at the other of said tubing surfaces.

16. Apparatus for separation of hydrogen from a gaseous mixture having a component which is capable, in the presence of a catalytic agent, of dissociating to yield hydrogen ions, comprising:
 (a) a thin film polymer blend membrane possessing a high protonic conductivity and which is formed by removing the solvent from a solution of a blend of three components, which components are a phosphoric acid, an organic polymer, and a poly organic acid wherein said phosphoric acid is present in the blend in an amount in the range of about 10 to about 50 mol % and is selected from a group consisting of hypophosphoric acid, metaphosphoric acid, orthophosphoric acid, pyrophosphoric acid, and polyphosphoric acid, wherein said organic polymer is present in the blend in an amount in the range of about 80% to about 40 mol % and is selected from a group consisting of poly(vinyl alcohol), poly(vinyl fluoride), polyethylenimine, poly(ethylene glycol), cellulose acetate, and copolymers having as repeat units the monomer units used in the polymers of said group, and wherein said poly organic acid is present in the blend in an amount in the range of about 10 to 40 mol. % and is selected from a group consisting of poly(acrylic acid), poly(methacrylic acid), poly(styrene sulfonic acid), and copolymers having as repeat units the monomer units used in the poly organic acids of said group;
 (b) a membrane housing comprising a first gas chamber and a second gas chamber separated by a partition comprising said membrane, said membrane having a first surface in common with the first gas chamber and a second surface in common with the second gas chamber;
 (c) a multiplicity of electrically conductive particles contained in and forming portions of said membrane, each particle having a first surface exposed to said first gas chamber and a second surface exposed to said second gas chamber;
 (d) two portions of catalytic agent effective to promote dissociation and combination associated with each particle, one portion in contact with said first surface and one portion in contact with said second surface of each particle;
 (e) means to supply said gaseous mixture to said first gas chamber; and, (f) means to recover hydrogen formed in said second gas chamber.

17. A method for separation of hydrogen from a gaseous mixture having a component which is capable, in the presence of a catalytic agent, of dissociating to yield hydrogen ions, such method comprising contacting said gaseous mixture with a first surface of a thin film polymer blend membrane possessing a high protonic conductivity and recovering hydrogen formed at a second surface of said membrane, said membrane having a multiplicity of electrically conductive particles contained in and forming a portion of it, each particle having a first particle surface in common with said first membrane surface and a second particle surface in common with a second surface of said membrane, two portions of catalytic agent effective to promote dissociation and combination are associated with each particle, one portion of catalytic agent in contact with the first particle surface and one portion of catalytic agent in contact with the second particle surface, which membrane isolates said gaseous mixture from a pure gas comprising hydrogen separated from the gaseous mixture, and which membrane has said second surface exposed to the pure gas, said membrane consisting of a thin film polymer blend membrane which is formed by removing the solvent from a solution of a blend of three components, which components are a phosphoric acid, an organic polymer, and a poly organic acid wherein said phosphoric acid is present in the blend in an amount in the range of about 10 to about 50 mol % and is selected from a group consisting of hypophosphoric acid, metaphosphoric acid, orthophosphoric acid, pyrophosphoric acid, and polyphosphoric, acid, wherein said organic polymer is present in the blend in an amount in the range of about 80% to about 40 mol % and is selected from a group consisting of poly(vinyl alcohol), poly(vinyl fluoride), polyethylenimine, poly(ethylene glycol), cellulose acetate, and copolymers having as repeat units the monomer units used in the polymers of said group, and wherein said poly organic acid is present in the blend in an amount in the range of about 10 to 40 mol. % and is selected from a group consisting of poly(acrylic acid), poly(methacrylic acid), poly(styrene sulfonic acid), and copolymers having as repeat units the monomer units used in the poly organic acids of said group.

* * * * *

UNITED STATES PATENT AND TRADEMARK OFFICE
CERTIFICATE OF CORRECTION

PATENT NO. : 4,795,536
DATED : January 3, 1989
INVENTOR(S) : Ping Young and Anthony J. Polak It is certified that error appears in the above-identified patent and that said Letters Patent is hereby corrected as shown below:

```
Column 10, line 4:   "cooper" should read --copper--.
Column 14, line 54:  after "particles" insert --provide the
                     necessary electron path. It is readily seen
                     that a membrane with particles--
Column 15, line 21:  "hydrogendepleted" should read
                     --hydrogen-depleted--.
Column 17, line 35:  after "units" delete ","
```

Signed and Sealed this

Tenth Day of October, 1989

Attest:

DONALD J. QUIGG

Attesting Officer

Commissioner of Patents and Trademarks